United States Patent
Schaal

(10) Patent No.: US 6,530,549 B2
(45) Date of Patent: Mar. 11, 2003

(54) HOLDER FOR A BEVERAGE CONTAINER FOR UPRIGHT INSTALLATION IN A MOTOR VEHICLE

(75) Inventor: Falk Schaal, Alpirsbach (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/894,381

(22) Filed: Jun. 28, 2001

(65) Prior Publication Data

US 2002/0005465 A1 Jan. 17, 2002

(30) Foreign Application Priority Data

Jun. 28, 2000 (DE) .......................... 100 31 360

(51) Int. Cl.⁷ ................................. B60N 3/10
(52) U.S. Cl. .................. 248/311.2; 224/926; 224/549; 224/556
(58) Field of Search ............... 248/311.2, 312, 248/315; 224/282, 483, 544, 549, 553, 556, 564, 565, 566, 926

(56) References Cited

U.S. PATENT DOCUMENTS

| | | | | |
|---|---|---|---|---|
| 4,728,018 A | * | 3/1988 | Parker ..................... 224/544 |
| 4,733,908 A | * | 3/1988 | Dykstra et al. .......... 248/311.2 |
| 4,826,058 A | * | 5/1989 | Nakayama ................ 224/275 |
| 4,907,775 A | * | 3/1990 | Lorence et al. .......... 248/311.2 |
| 4,955,571 A | * | 9/1990 | Lorence et al. .......... 248/311.2 |
| 5,505,417 A | * | 4/1996 | Plocher ..................... 224/926 |
| 5,618,018 A | | 4/1997 | Baniak ..................... 248/311.2 |
| 5,762,307 A | * | 6/1998 | Patmore .................... 224/926 |
| 5,829,726 A | | 11/1998 | Withun ..................... 248/311.2 |
| 5,845,888 A | * | 12/1998 | Anderson ................. 248/311.2 |
| 5,865,411 A | * | 2/1999 | Droste et al. ............. 224/926 |
| 5,997,082 A | * | 12/1999 | Vincent et al. .......... 248/311.2 |
| 6,024,395 A | * | 2/2000 | Kang ........................ 296/37.1 |
| 6,047,937 A | * | 4/2000 | Huang ..................... 248/311.2 |
| 6,095,471 A | * | 8/2000 | Huang ........................ 224/400 |

FOREIGN PATENT DOCUMENTS

| | | |
|---|---|---|
| DE | 298 23 020 U1 | 4/1999 |
| EP | 0 838 365 A1 | 4/1998 |
| JP | 406156139 A * | 6/1994 ............. 224/282 |

OTHER PUBLICATIONS

Patent Abstract of Japan 11011200 A, Jan. 19, 1999.
Patent Abstracts of Japan 09052550 A Feb. 25, 1997.

* cited by examiner

Primary Examiner—Ramon O. Ramirez
Assistant Examiner—Jon A. Szumny
(74) Attorney, Agent, or Firm—Michael J. Striker

(57) ABSTRACT

A holder for a beverage container for upright installation in a motor vehicle has a carrier, guide means by which the carrier is movably guided from a retracted, basic position, into a raised, use position and vice-versa, a holding piece which is mounted on the carrier and has an insertion opening for inserted a beverage container, the holding piece being pivotally mounted on the carrier and being arranged to be pivoted from a basic position, wherein the holding piece is located approximately in a plane of movement of the carrier, into use position wherein the holding piece occupies an at least approximately horizontal position and vice-versa.

4 Claims, 2 Drawing Sheets

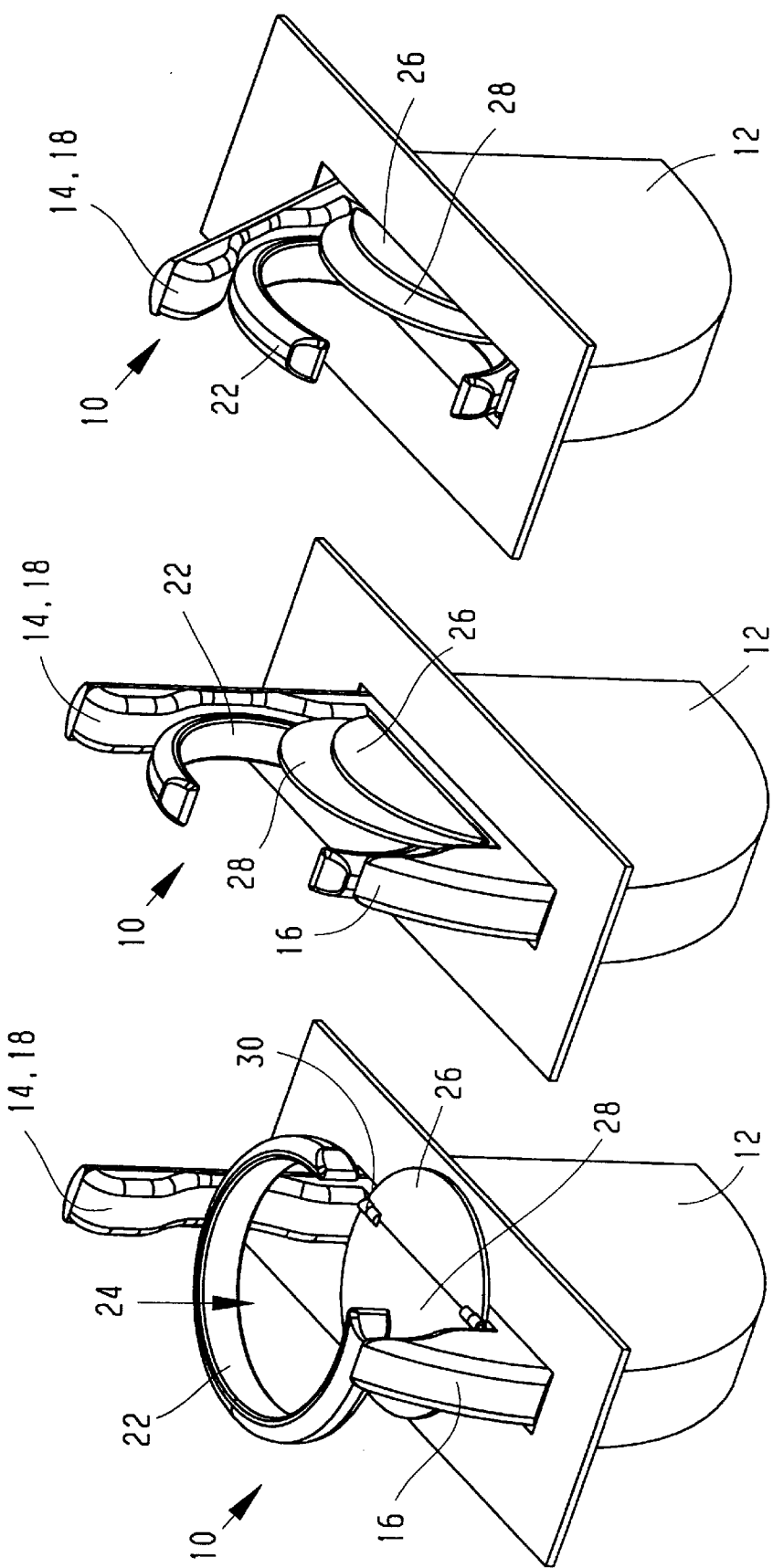

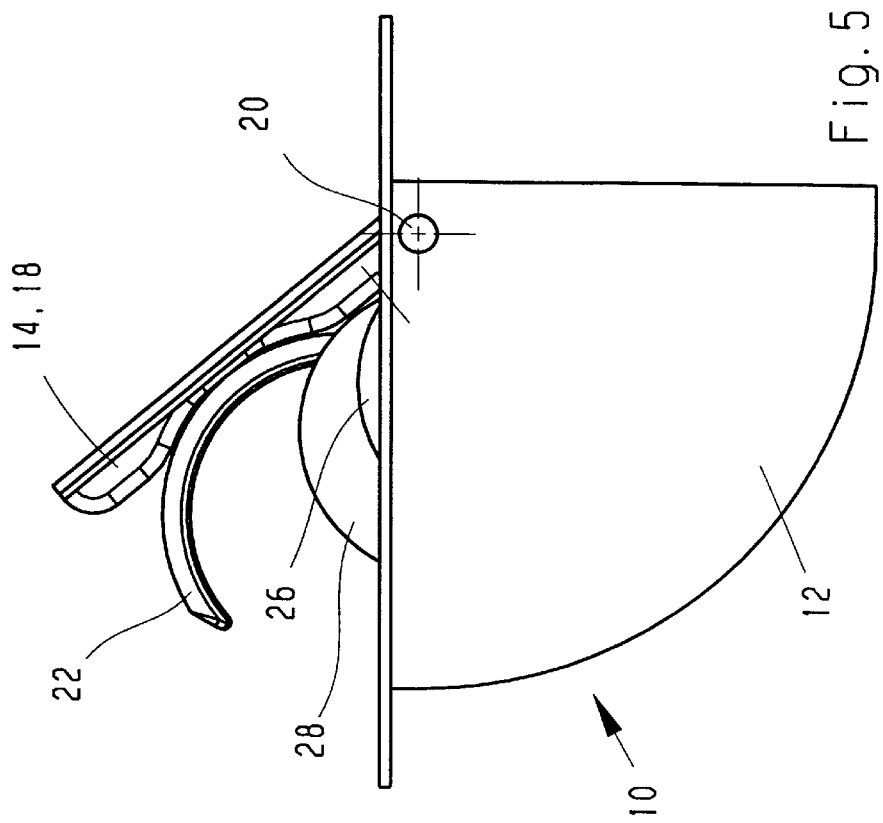
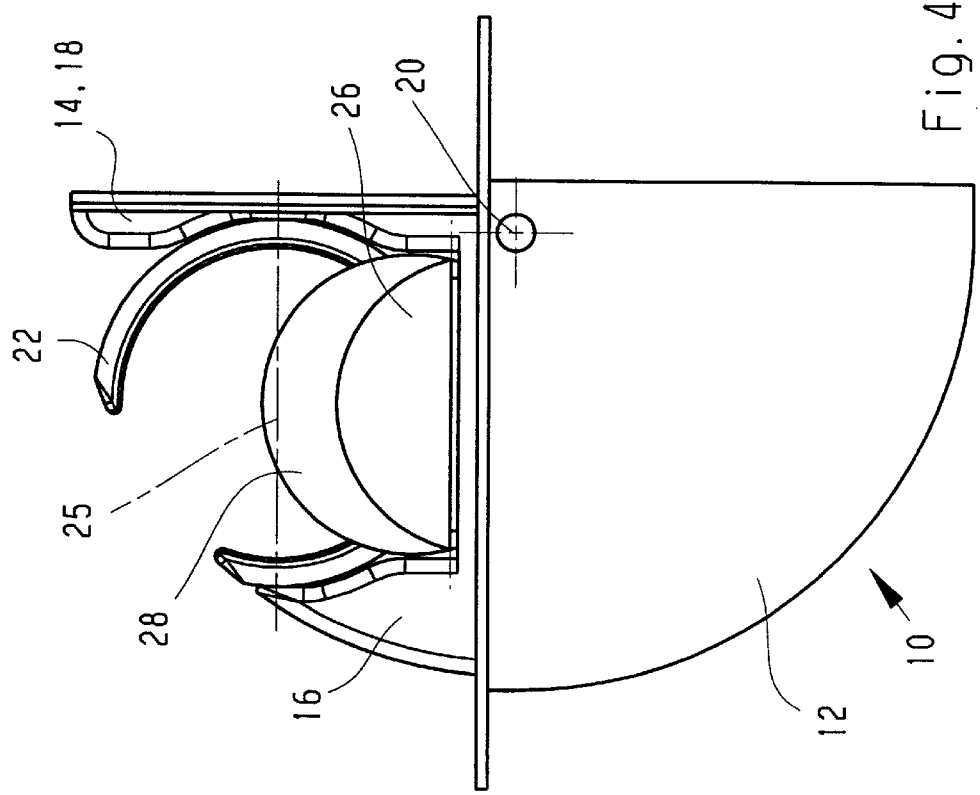

HOLDER FOR A BEVERAGE CONTAINER FOR UPRIGHT INSTALLATION IN A MOTOR VEHICLE

BACKGROUND OF THE INVENTION

The present invention relates container for upright installation in a motor vehicle.

More particularly, the invention relates to a holder for a beverage container such as, for example, a cup, a beaker or a beverage can, which holder is intended for upright installation, for example in a central console in a motor vehicle.

More particularly, are known holders for beverage containers for installation in a dashboard of a motor vehicle which have a carrier that is guided out, pivotally or displaceably, from a basic position retracted into the dashboard into a use position projecting out from the dashboard. The carrier moves in an approximately perpendicular direction with respect to the dashboard, that is to say in an approximately horizontal plane of movement. The holder is located in the plane of movement, that is to say it is arranged in an approximately horizontal, or flat, position. The known holders having a holding piece which has an insertion opening for inserting the beverage container and which supports an inserted beverage container laterally against tipping. The holding piece can be a part that is separate from the holder but mounted on the holder. The holder itself can also form the holding piece, in which case it has the insertion opening for inserting the beverage container.

SUMMARY OF THE INVENTION

It is therefore an object of present invention to provide a beverage container holder which is suitable for upright installation in a motor vehicle.

In keeping with these objects and with others which will become apparent hereinafter, one feature of present invention resides, briefly stated, in a holder for a beverage container for upright installation in a motor vehicle in which the holding piece having the insertion opening is held on the carrier pivotally.

The holding piece can be pivoted out from a basic position into a use position and vice-versa. In the basic position, the holding piece is located approximately in the plane of movement of the carrier. In the use position, the holding piece is at angle to the plane of movement of the carrier and especially is so located in a horizontal plane that a beverage container can be inserted in an upright position. The carrier has a direction of movement from down to up. The carrier can move in an approximately vertical plane of movement and, therefore, in an approximately perpendicular direction with respect to an approximately horizontal surface, for example that of a central console of a motor vehicle. In the basic position, the holding piece is located in the approximately vertical plane of movement of the carrier. As a result thereof, the holder according to the invention can be of narrow construction and can be installed in space-saving manner in, for example, a central console of a motor vehicle.

In order to insert a beverage container into the holder according to the invention, the holding piece of the carrier moved into the raised, use position is pivoted into the approximately horizontal, use position, in which a beverage container can be inserted into the insertion opening of the holding piece. The holder according to the invention has the advantage that it can be installed in space-saving manner in, for example, a central console of a motor vehicle.

The guide means for the carrier can be in the form of a slide guide. In an embodiment of the invention in the carrier has a pivotal mounting as a guide means.

In accordance with another embodiment, the holding piece having the insertion opening for the beverage container can be pivoted through approximately 90° from the basic position located in the plane of movement of the carrier into a horizontal, use position. When the plane of movement of the carrier is vertical, the angle of pivot of the holding piece is 90°. When the plane of movement of the carrier is not exactly vertical but rather on a slight slant, the angle of pivot of the holding piece can differ from 90°.

In accordance with a further embodiment of the invention, the holding piece has an interrupted partial ring which surrounds part of the circumference of an inserted beverage container. The wrap-around angle is greater than 180° so that the partial ring supports the inserted beverage container laterally in all directions against tipping over. Constructing the holding piece with an interrupted partial ring instead of a complete ring has the advantage that the partial ring is smaller than a complete ring, which reduces the space required by the holder according to the invention. A further advantage of an uninterrupted ring is that a cup having a handle can be inserted, the handle in that case being located in the interruption in the ring.

It is a further embodiment of the invention, the holder has a flat stand element, on which a beverage container inserted in the holder stands. In order that the stand element can likewise be accommodated in space-saving manner, it is also pivotally mounted on the carrier. The stand element can be pivoted from a basic position, in which it is located in the plane of movement of the carrier, into a horizontal, use position and vice-versa. In the horizontal, use position, a beverage container can be inserted through the insertion opening of the holding piece and placed on the stand element.

In a further development of the invention, the stand element is constructed from two parts, the two parts being so mounted on the carrier that they can be pivoted in opposite directions. Constructing the stand element from two parts likewise has the advantage that less space is required; the space through which the stand element passes on pivoting is reduced when the stand element is constructed from two parts.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1 to 3 show perspective views of a holder according to the invention in various positions; and FIGS. 4 and 5 show side views of the holder of FIGS. 1 to 3 in different states.

DESCRIPTION OF THE PREFERRED EMBODIMENTS

The holder 10 according to the invention shown in the drawing is intended for upright, that is to say vertical, installation in, for example, a motor vehicle central console (not shown) having an approximately horizontal surface.

The holder 10 has a flat housing 12, the side walls of which are in the shape of quarter-circle sectors. Mounted in the housing 12 is a pincer-form carrier 14 having two legs 16, 18 arranged spaced apart from one another. One of the two legs 16 is approximately half the length of the other leg 18. When the holder 10 is closed (not shown), the long leg 18 closes off the upper face of the housing 12.

For the purpose of pivotally connecting the carrier 14 to the housing 12, the carrier 14 has two laterally projecting pins 20, which are lodged in the mounting holes in the side walls of the housing 12. The pivot pins 20 lodged in the mounting holes form a pivotal mounting or, more generally, a guide means for the carrier 14 on the housing 12. The pivot pins 20 are arranged on the carrier 14 in a base region of the long leg 18. By means of the pivotal mounting 20, the carrier 14 can be pivoted out from a retracted, basic position (not shown) located in the housing 12 into the raised, use position shown in FIGS. 1 and 4, and vice-versa. In the use position, the legs 16, 18 of the carrier 14 project vertically upwards from the housing 12.

Arranged between the two legs 16, 18 is a rotatably mounted holding piece 22. The holding piece 22 is in the form of a partial ring which is interrupted at a location on its circumference and which extends circumferentially for about three quarters of a full circle. The holding piece surrounds an insertion opening 24 for inserting a beverage container (not shown) such as, for example, a beaker, a cup or a drinks can. The pivotal axis 25 (FIG. 4) of the holding piece is oriented perpendicular to the pivotal axis of the carrier 14, the latter being defined by the pivotal mounting 20. When the carrier 14 is in the use position shown in FIGS. 1 and 4, the pivotal axis 25 of the holding piece 22 is oriented horizontally.

For pivotal mounting, the holding piece 22 has two pivot pins (not shown in the drawing) arranged opposite one another, which project radially outwards and are lodged in mounting holes in the legs 16, 18 of the carrier 14. The mounting holes are located at a free end of the short leg 16 and in the middle of the long leg 18 of the carrier 14, that is to say at the same height on the carrier 14 when it is in the use position. As a result of the pivotal mounting, the holding piece 22 can be pivoted into the horizontal, use position shown in FIG. 1, when the carrier 14 is in its use position. When it is not being used, the holding piece 22 can be pivoted into a vertical, basic position, shown in FIGS. 2 to 5.

In the basic position, the holding piece 22 is in a plane together with the legs 16, 18 of the carrier 14 and in the plane of movement of the carrier 14. The plane of movement of the carrier 14 is determined by its pivotal mounting 20 in the housing 12. The place of movement of the carrier 14 is perpendicular to the pivotal axis defined by the pivotal mounting 20 of the carrier 14. When the holding piece 22 has been pivoted into its basic position, the carrier 14, together with the holding piece 22 mounted thereon, can be pivoted on its basic position in the housing 12. In the basic position, the long leg 18 of the carrier 14 is oriented horizontally and forms a flush cover on the upper face of the housing 12. FIGS. 3 and 5 show an intermediate position between the use position and basic position for the carrier 14, illustrating the pivoting of the carrier 14 from the raised, use position into the retracted, basic position.

The holder according to the invention 10 has a flat stand element 26, 28. In the use position, the stand element 26, 28 is located in a horizontal plane below the holding piece 22 and spaced away therefrom so that a beverage container that has been inserted into the insertion opening 24 of the holding piece 22 stands on the stand element 26,28. The stand element 26, 28 is constructed from two parts, the two parts 26, 28 of the stand element 26, 28 making up a fully circular disc. One of the two parts 26 in this arrangement is smaller than a semi-circle and the other part 28 is correspondingly larger, The two parts 26, 28 of the stand element can be pivoted about a common pivotal axis by means of a pivot pin connection 30. The pivotal axis of the two parts 26, 28 of the stand element is oriented parallel to, and below, the pivotal axis 25 of the holding piece 22, spaced away therefrom.

When the holder 14 is in the use position, the pivotal axis of the two parts 26, 28 of the stand element is oriented horizontally. The pivot pin connection 30 of the two parts 26, 28 of the stand element is arranged in a base region of the legs 16, 18 of the holder 14. When not in use, the two parts 26, 28 of the stand element are pivoted upwards into a vertically upright position, as shown in FIG. 2, so that they are located between the legs 16, 18 of the holder 14. When the holding piece 22 is also pivoted into a vertical, basic position, the holder 14 can be pivoted down into its basic position retracted into the housing 12, as described above.

It will be understood that each of the elements described above, or two or more together, may also find a useful application in other types of constructions differing from the types described above.

While the invention has been illustrated and described as embodied in holder for a beverage container for upright installation in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A holder for a beverage container for upright installation in a motor vehicle, comprising a carrier; guide means by which said carrier is movably guided from a retracted, basic position, into a raised, use position and vice-versa; a holding piece which is mounted on said carrier and has an insertion opening for inserting a beverage container; said holding piece being pivotally mounted on said carrier and being arranged to be pivoted between a lower retracted basic position, wherein said holding piece is located approximately in a plane of pivoting of said carrier, and a use position wherein said holding piece occupies an at least approximately horizontal position, said guide means for said carrier including a pivotal mounting, said holder having a flat stand element, on which in a use position a beverage container inserted in said holder can stand, said stand element being mounted on said carrier so as to be pivotable between a basic position, in which it is located in the plane of movement of said carrier, and a horizontal, use position.

2. A holder as defined in claim 1, wherein said stand element is composed of two parts, said parts being arranged to be pivoted in opposite directions.

3. A holder as defined in claim 1, wherein said holding piece is formed so as to be pivoted through approximately 90° from an approximately vertical, basic position into a horizontal use position.

4. A holder as defined in claim 1, wherein said holding piece has an uninterrupted partial ring which is formed so as to surround an inserted beverage container over more than 180° in a circumferential direction.

* * * * *